United States Patent
Licata

[11] Patent Number: 6,029,605
[45] Date of Patent: Feb. 29, 2000

[54] MULTIPLE ENVIRONMENT TANK

[76] Inventor: Robert F. Licata, 203 Rivington St., #5J, New York, N.Y. 10002

[21] Appl. No.: 09/099,628

[22] Filed: Jun. 18, 1998

[51] Int. Cl.$^7$ .................................................... A01K 63/00
[52] U.S. Cl. .............................................................. 119/246
[58] Field of Search .................................... 119/245, 246, 119/247, 248, 253, 254, 256

[56] References Cited

U.S. PATENT DOCUMENTS

| | | | |
|---|---|---|---|
| 3,141,442 | 7/1964 | Harris . | |
| 3,517,649 | 6/1970 | Holden | 119/253 |
| 3,699,921 | 10/1972 | Janicek . | |
| 3,786,781 | 1/1974 | Poulsen . | |
| 3,804,064 | 4/1974 | Kuneman et al. . | |
| 4,081,666 | 3/1978 | Roehrick | 362/253 |
| 4,122,800 | 10/1978 | Mangarell | 119/246 |
| 4,133,024 | 1/1979 | Roehrick | 362/101 |
| 4,176,620 | 12/1979 | Kassos . | |
| 4,201,153 | 5/1980 | Nace | 119/224 |
| 4,300,478 | 11/1981 | Wise | 119/249 |
| 4,708,089 | 11/1987 | Goldman et al. | 119/248 |
| 4,754,571 | 7/1988 | Riechmann . | |
| 4,788,938 | 12/1988 | Davenport . | |
| 4,820,556 | 4/1989 | Goldman et al. | 428/7 |
| 4,995,334 | 2/1991 | Wechsler . | |
| 5,121,709 | 6/1992 | Wechsler . | |
| 5,127,366 | 7/1992 | Kim . | |
| 5,135,400 | 8/1992 | Ramey | 434/297 |
| 5,183,004 | 2/1993 | Trent et al. . | |
| 5,445,112 | 8/1995 | Grosman | 119/265 |
| 5,693,220 | 12/1997 | Sceusa . | |
| 5,722,347 | 3/1998 | Tominaga et al. | 119/253 |
| 5,957,085 | 9/1999 | Youngstrom et al. | 119/246 |

Primary Examiner—Michael J. Carone
Assistant Examiner—James S. Bergin
Attorney, Agent, or Firm—Eugene Stephens & Associates

[57] ABSTRACT

A tank provides multiple environments in upper and lower regions of the tank. A land plate divides the tank into the upper and lower regions and provides a terrestrial environment in which terrestrial and amphibious animals can live. A ramp extends from the land plate into the lower region, which is filled with water to a minimum water level of at least the bottom edge of the ramp. When filled with water to the minimum water level, the lower region provides an aquatic environment in which aquatic and amphibious animals can live. The ramp allows travel between the terrestrial environment and the aquatic environment. An opening in an end of the tank beneath the land plate allows for easy access to and maintenance of the aquatic environment. An island can also be placed beneath the land plate, and opaque material can be placed on the walls of the tank in the lower region to provide a subterranean environment.

22 Claims, 2 Drawing Sheets

MULTIPLE ENVIRONMENT TANK

TECHNICAL FIELD

The invention relates to the field of tanks and enclosures for pets such as reptiles, arachnids, insects, amphibians, and fish. Specifically, the invention relates to tanks designed for use with multiple or single species requiring different or plural environments.

BACKGROUND OF THE INVENTION

Most tank enclosures for pets simply have four walls and a bottom. The pets are typically prevented from escaping by a removable plastic cover. Many people prefer to have more than one type of environment in their tanks to house different types of animals in the same tank. As a result, many people pile soil or gravel on part of the tank bottom for a land or terrestrial environment, then put water in the tank to have an aquatic environment as well. This allows the keeping of land animals, amphibious animals, and aquatic animals all in the same tank. However, piling gravel or soil on the bottom of the tank greatly reduces the amount of space available for the aquatic environment, which is highly undesirable. In addition, soil and minerals can foul the water and clog filters and pumps used for the aquatic environment.

One solution to this problem is to use a removable cover as a terrestrial environment, place additional walls above the removable cover, and place a second removable cover on the additional walls to prevent escape of the animals. In effect, there are two tanks: an aquarium on the bottom and a terrarium on top, the terrarium having a hole in its bottom so animals that want to travel between the tanks can do so. While this solves the problem to a point, maintenance of the aquarium can be done only by removing the top walls. To ease maintenance of the aquarium and the terrarium, doors are placed in one of the second set of walls; but the doors provide an escape route for animals in the terrestrial environment when the doors are open.

SUMMARY OF THE INVENTION

My invention provides terrestrial and aquatic environments within the confines of a single tank with a single cover, yet allows for easy, convenient access to and maintenance of the aquatic environment. I place a land plate in the tank and a ramp extending from the land plate down and toward a wall of the tank. I leave a gap between the end of the ramp and the wall of the tank so that, when water is placed in the tank to a level just above the end of the ramp, animals can travel between the water and the land plate.

Soil, gravel, or a material simulating land can be placed on the land plate to enhance the terrestrial environment. A hole can be made in the land plate to allow the outflow of a pump of the aquatic environment to be used to create a stream over the land plate.

I prefer to support my land plate and ramp with adhesive, affixing the edges of the land plate to the walls of the tank. However, the land plate can also be bolstered or removably supported by legs. The ramp can also be bolstered or removably supported by legs.

For access to the aquatic environment, I provide an access opening beneath the land plate in a wall of the tank above the highest level to which water will rise. I size the opening so that an average adult human hand laden with aquarium equipment can easily navigate the opening and reach all or most of the aquatic environment. Opaque material can be placed on the walls of the tank beneath the land plate to simulate a subterranean environment, and an island can be placed beneath the land plate for further tank versatility and enhancement.

DESCRIPTION OF THE INVENTION

Figure 1:
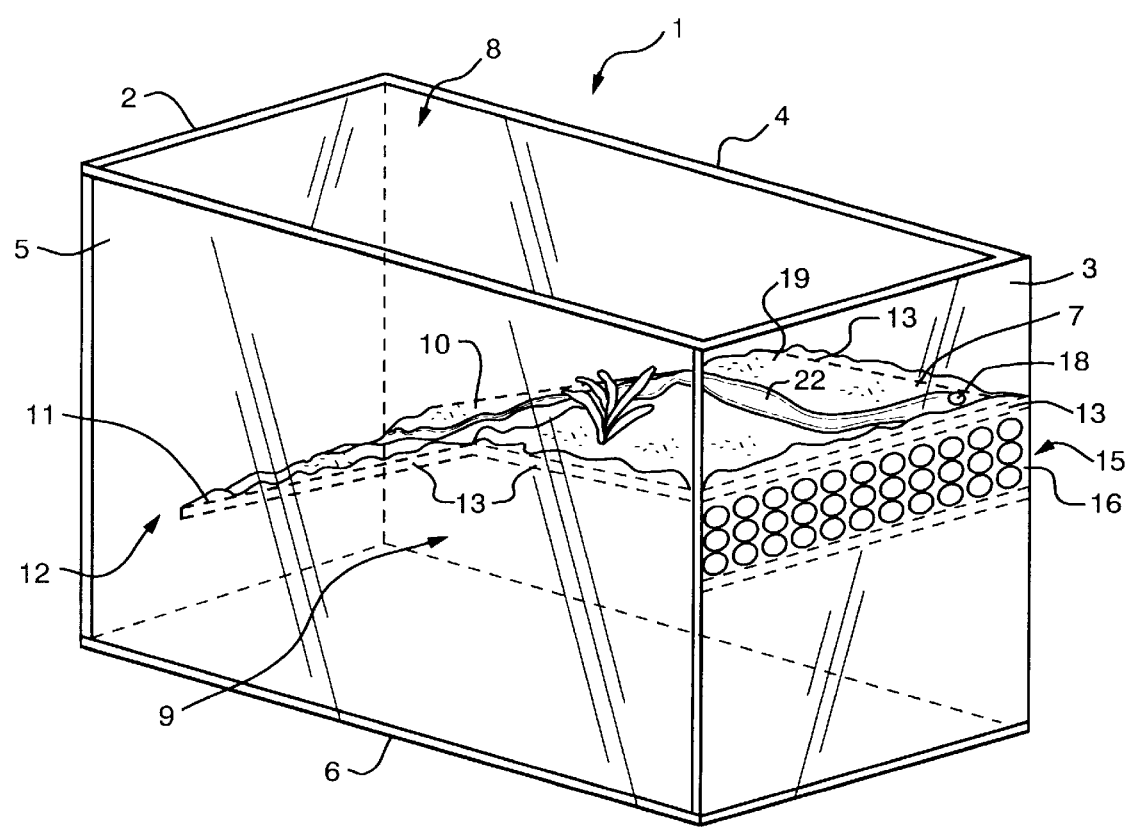
FIG. 1 is a perspective view of an exemplary embodiment of the invention.

For the purposes of description, I will describe an exemplary embodiment of my inventive tank 1 having four walls that include first and second ends 2, 3 and first and second sides 4, 5 and a bottom 6 as shown in the accompanying Figures. My invention is not limited to this embodiment and can have any number of walls desired. I prefer to place my land plate 7 so that it abuts the sides 4, 5 of the tank 1 and the second end 3 of the tank 1. While I prefer to affix the land plate 7 to the sides 4, 5 and the second end 3 of the tank 1 with adhesive as indicated by the adhesive joints 13, one or more legs 14 can be used to support the land plate 7 alone or in conjunction with the adhesive. Any waterproof adhesive can be used, such as silicone-based adhesives. I prefer to form the adhesive joints 13 along the entirety of the edges of the land plate 7 and the ramp 10 to be affixed, though the adhesive joints 13 could be formed in other manners so long as they could withstand the loads to which they would be subjected. The land plate 7 divides the tank into upper and lower regions 8, 9 with a terrestrial environment 23 being provided in the upper region 8. An aquatic environment or aquarium 24 is provided in the lower region 9 when the lower region 9 is filled with water to a minimum water level 17.

I include a ramp 10 that abuts and extends from the land plate 7 toward the first end 2 of the tank 1, but has an end 11 that falls short of the first end 2 of the tank 1. This leaves a gap 12 through which animals in the tank 1 can travel between the water (when the tank 1 is filled) and the ramp 10 and land plate 7. The ramp 10 is thus an interlevel access ramp since it allows access between the upper and lower regions 8, 9 of the tank 1. While soil or gravel can be used to enhance the terrestrial environment 23, I prefer to use simulated land 19 on the land plate 7 and/or the ramp 10. The simulated land 19 can be made from plastic, foam, or any other suitable material that will resist erosion to preserve the integrity of the tank 1. Using simulated land 19 avoids excessive clogging of aquarium filters and pumps from suspended soil particles and the like. Where I include a hole 18 for the outflow of a pump or filter, I also include a bed for a stream 22 in the soil, gravel, or simulated land 19 to enhance the terrestrial environment 23. In this case, I also provide for a sloping surface of the simulated land 19 either by inclining the land plate 7 or by appropriate shaping of the simulated land 19. The incline of the land plate 7 should be enough for adequate flow of water through the stream 22, but should not be so great as to make it hard for animals to stay on the land plate 7.

Figure 2:
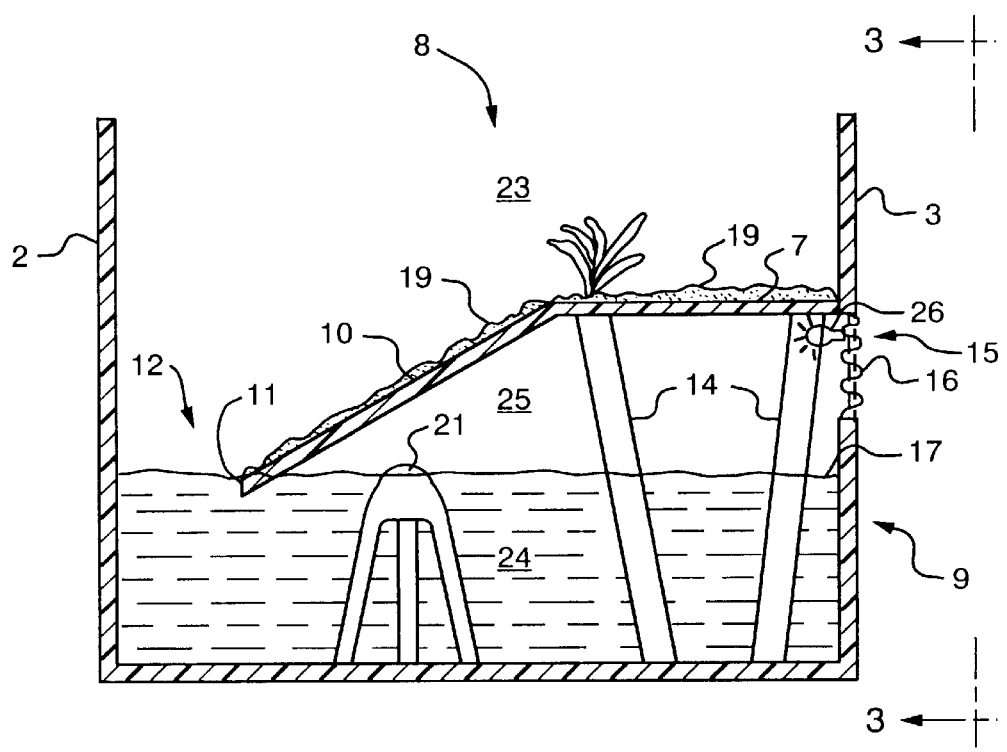
FIG. 2 is a side cross-sectional view of the exemplary embodiment of the invention shown in FIG. 1.
Figure 3:
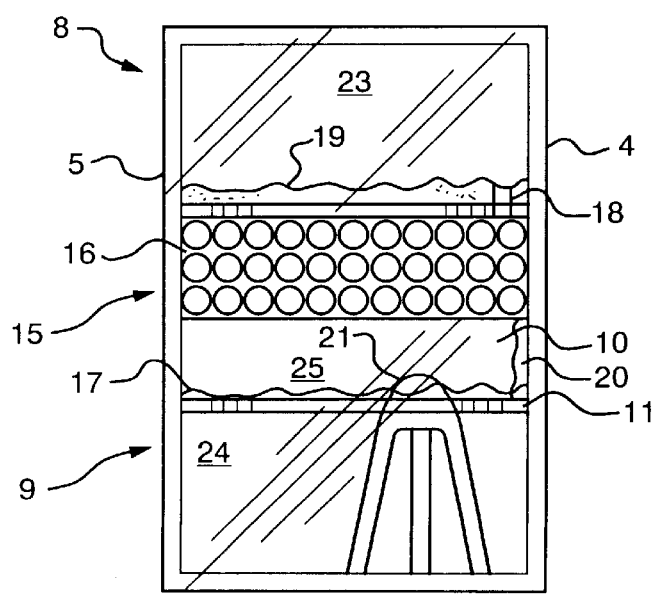
FIG. 3 is an end view of the exemplary embodiment of the invention shown in FIG. 1 as seen from the line 3—3 in FIG. 2.

As shown in FIGS. 1–3, the land shelf 7 and ramp 10 together overlie a substantial portion of the bottom 6 of the tank 1 in the preferred embodiment of my invention. The land shelf 7 should be sized so as to provide a terrestrial environment 23 of adequate size for terrestrial and amphibious creatures to be housed in the tank, and the ramp 10 must be sloped gently enough that the terrestrial and amphibious creatures can climb into and out of the aquatic environment 24 with relatively little or no difficulty.

I form an access or maintenance opening 15 in the second end 3 of the tank 1 below the land plate 7. The access opening 15 gives access to the lower region of the tank 1 where the aquarium is provided and should be sized so that a human hand can pass through the opening 15 while holding aquarium maintenance equipment, such as nets and tank vacuums. I prefer to cover the opening 15 with a grille 16 to prevent inadvertent escape of animals from the aquatic environment 24 of the lower region 9. The ramp 10 and opening 15 are preferably arranged so that the minimum water level 17 is enough below the lower edge of the opening 15 to prevent spillage of the water from the lower region 9 of the tank 1. Additionally, pumps, filters, and other equipment can be supported in the opening 15 to allow easier access by such equipment to the aquarium portion of the tank 1.

A subterranean environment or cave-like environment 25 can be created by placing opaque material 20 on one or more of the first and second sides 4, 5 and the second end 3 of the tank 1 to simulate a cave wall. A lamp 26 can be mounted in the subterranean or cave-like environment 25 to facilitate viewing of the creatures and objects therein. I prefer to mount such a lamp on the grille 16 covering the access opening 15. Additionally, an island 21 can be placed in the lower region 9 of the tank 1 so that it protrudes above the minimum water level 17 beneath the land plate 7. Use of an island 21 provides a resting place for swimming terrestrial and/or amphibious animals so that they do not need to climb up the ramp 10 to rest.

With my flexible arrangement, a variety of environments can be provided in a single tank with a single cover. No cantilevered land plates are needed, greatly reducing wear on the walls of the tank. No second tank sits atop the tank with a land plate and ramp acting as a cover for the lower tank, reducing the number of parts of the overall structure and rendering maintenance of the aquarium portion of the tank much easier than prior art structures.

Parts List
1 Tank
2, 3 Ends of tank
4, 5 Sides of tank
6 Bottom of tank
7 Land plate
8 Upper region
9 Lower region/aquarium
10 Ramp
11 End or ramp
12 Gap between end of ramp and end of tank
13 Adhesive joint
14 Leg
15 Access opening
16 Grille for access opening
17 Minimum water level
18 Hole in land plate for accessory
19 Simulated land
20 Material simulating cave wall
21 Island
22 Stream
23 Land or terrestrial environment
24 Aquarium or aquatic environment
25 Cave-like or subterranean environment
26 Lamp

I claim:

1. A multiple environment tank including:
    a land shelf supported between a top and a bottom of the tank at a level from which escape by animals is substantially prevented, the land shelf abutting walls of the tank;
    a ramp attached to the land shelf and extending from the land shelf toward the bottom of the tank and toward a wall of the tank that is also a first end of the tank;
    a gap between an end of the ramp and the first end of the tank;
    the gap being sized to allow passage of animals to and from the land shelf and a lower region beneath the ramp and the land shelf, the lower region being configured to be filled with water up to at least a minimum water level that is substantially equal to a level of the end of the ramp and over the entirety of the bottom of the tank; and
    an opening in the second end of the tank between the land shelf and the bottom of the tank, the opening being located above the level of the end of the ramp and sized to allow access to the lower region.

2. The tank of claim 1 wherein the land shelf and ramp are removably supported in the tank.

3. The tank of claim 1 wherein the land shelf and ramp are supported by and affixed to walls of the tank with an adhesive.

4. The tank of claim 3 wherein the adhesive is a silicone adhesive.

5. The tank of claim 1 further including an island arranged in the lower region, a portion of the island projecting above the level of the end of the ramp so that it remains above water when the lower region is filled with water.

6. The tank of claim 1 wherein the land shelf is arranged to provide a waterway using the outflow of a water pump.

7. A multiple environment tank including:
    a terrestrial environment supported in the tank between a top and a bottom of the tank, the terrestrial environment being arranged to house animals capable of living on land and spaced below the top of the tank to hinder escape of animals housed therein;
    an aquatic environment below the terrestrial environment, the aquatic environment being arranged to be filled with water to house animals capable of living in water;
    a ramp extending from the terrestrial environment into the aquatic environment so that animals can travel between the two environments; and
    an aquatic environment maintenance opening disposed in a wall of the tank below the terrestrial environment and above a level to which the aquatic environment is to be filled with water over the entire bottom of the tank so that a user of the tank has easy access to the aquatic environment.

8. The tank of claim 7 further including a subterranean environment below the terrestrial environment.

9. The tank of claim 8 wherein material simulating a cave wall is affixed to a wall of the tank beneath the terrestrial environment.

10. The tank of claim 7 further including an island in the aquatic environment.

11. The tank of claim 10 wherein the island is beneath the terrestrial environment.

12. The tank of claim 7 wherein the terrestrial environment includes simulated land on a land shelf that is affixed to walls of the tank with an adhesive.

13. The tank of claim 12 wherein the tank has four walls and the land shelf is affixed to three of the walls with the ramp being affixed to the land shelf and extending from the land shelf toward a fourth wall and toward the aquatic environment.

14. The tank of claim 13 wherein the ramp ends before reaching the fourth wall, leaving a gap between an end of the ramp and the fourth wall, the gap being sized and the end of the ramp being placed at a level so that animals can travel between the aquatic environment and the terrestrial environment.

15. A multiple environment tank comprising:
a plurality of levels within walls of the tank and between a top and a bottom of the tank, one level providing for a terrestrial environment in which terrestrial and amphibious animals can be housed and another level providing for an aquatic environment in which aquatic and amphibious animals can be housed;
an interlevel access opening in a side wall of the tank below the level providing for a terrestrial environment and above the level providing for an aquatic environment, the access opening being sized to allow passage of human hands, tools, and equipment used to maintain the aquatic environment; and
an interlevel access ramp that provides a route for animals to travel between the level that provides for a terrestrial environment and the level providing for an aquatic environment.

16. The tank of claim 15 wherein the level providing for a terrestrial environment is attached to a wall of the tank.

17. The tank of claim 16 wherein the level providing for a terrestrial environment is attached to the wall with an adhesive.

18. The tank of claim 16 wherein the level providing for a terrestrial environment includes at least one of gravel, soil, and simulated land supported on a plate and shaped to simulate a habitat of a terrestrial animal.

19. The tank of claim 15 wherein a subterranean environment is arranged between the level providing for an aquatic environment and the level providing for a terrestrial environment.

20. The tank of claim 19 wherein the subterranean environment is produced by placing opaque material on a wall of the tank.

21. The tank of claim 15 wherein the level providing for an aquatic environment includes a bottom wall of the tank and portions of side walls of the tank defining a volume arranged to be filled with water up to at least a bottom edge of the interlevel access ramp.

22. The tank of claim 15 wherein an island is arranged below the level providing for a terrestrial environment.

* * * * *